Aug. 28, 1934.     W. G. HOELSCHER     1,971,956
LATHE
Filed May 3, 1933     3 Sheets-Sheet 2

Fig. 2.

Aug. 28, 1934.  W. G. HOELSCHER  1,971,956
LATHE
Filed May 3, 1933   3 Sheets-Sheet 3
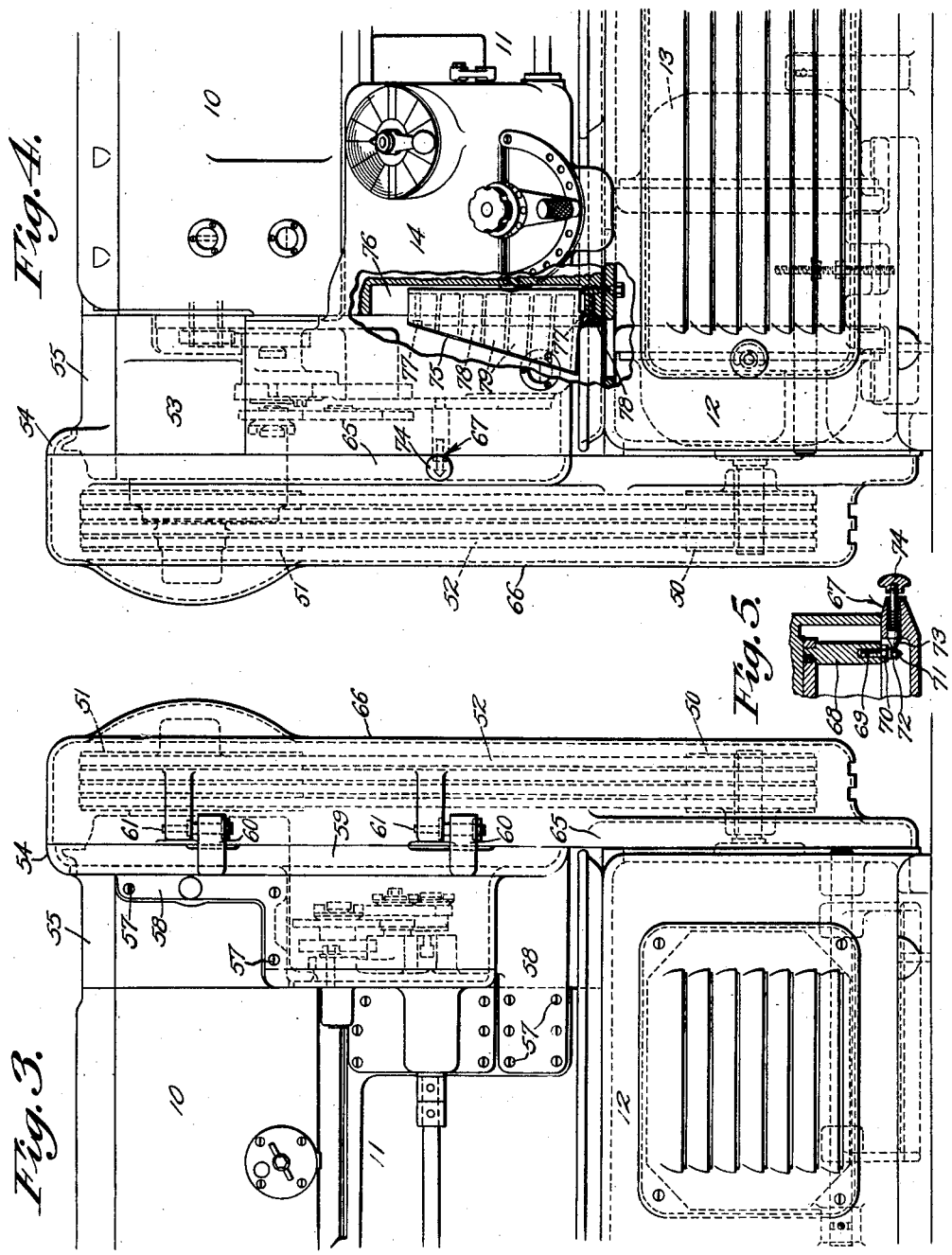

Patented Aug. 28, 1934

1,971,956

UNITED STATES PATENT OFFICE 1,971,956

LATHE

William G. Hoelscher, Norwood, Ohio, assignor to The American Tool Works Company, Cincinnati, Ohio, a corporation of Ohio Application May 3, 1933, Serial No. 669,214

5 Claims. (Cl. 82—32)

This invention relates to machine tools and is particularly directed to improvements at the headstock end of lathes. These improvements are primarily in connection with a casing arrangement and the disposition of the machine parts for convenient closure of the headstock end of the lathe for accessibility to transmission parts usually found at this end of the machine.

It is an object of this invention to provide a conveniently accessible arrangement of the transmission mechanism at the headstock end of a lathe particularly in respect to those gears which are interchangeable and adjustable and to provide in conjunction with this improved arrangement of the transmission an improved closure, whereby all moving parts extended from the headstock including the power are entirely encased and hidden, and whereby access is had to the various parts requiring adjustment and adapted to be interchanged by opening a single door which approximately covers the entire end of the lathe. The headstock gearing is extended exteriorly of the end of the headstock for the purpose of driving the feed box and the carriage transmission shafts as well as the back shafts and the power is incorporated in the same end of the lathe.

It is a further object of this invention to provide a gear rack in which the various change or replacement gears needed in the drive from the headstock may be pigeon holed, which gear rack is accessibly mounted and incorporated in the headstock outer end adjacent the transmission to which it is applicable and in position to be readily covered by the closure.

Figure 2 is an end view of the headstock end of the lathe with the cover removed showing the arrangements of the power transmission parts at this end.

Figure 3 is a fragmentary rear view of the headstock end of the lathe, further illustrating the closure.

Figure 4 is a fragmentary front view of the headstock end of the lathe showing the cover and a portion of the view being broken away to illustrate the gear cabinet mounted in the forward end of the headstock.

Figure 5 is a sectional view taken on line 5—5, Figure 2, detailing the latch mechanism for the end closure.

Figure 1:
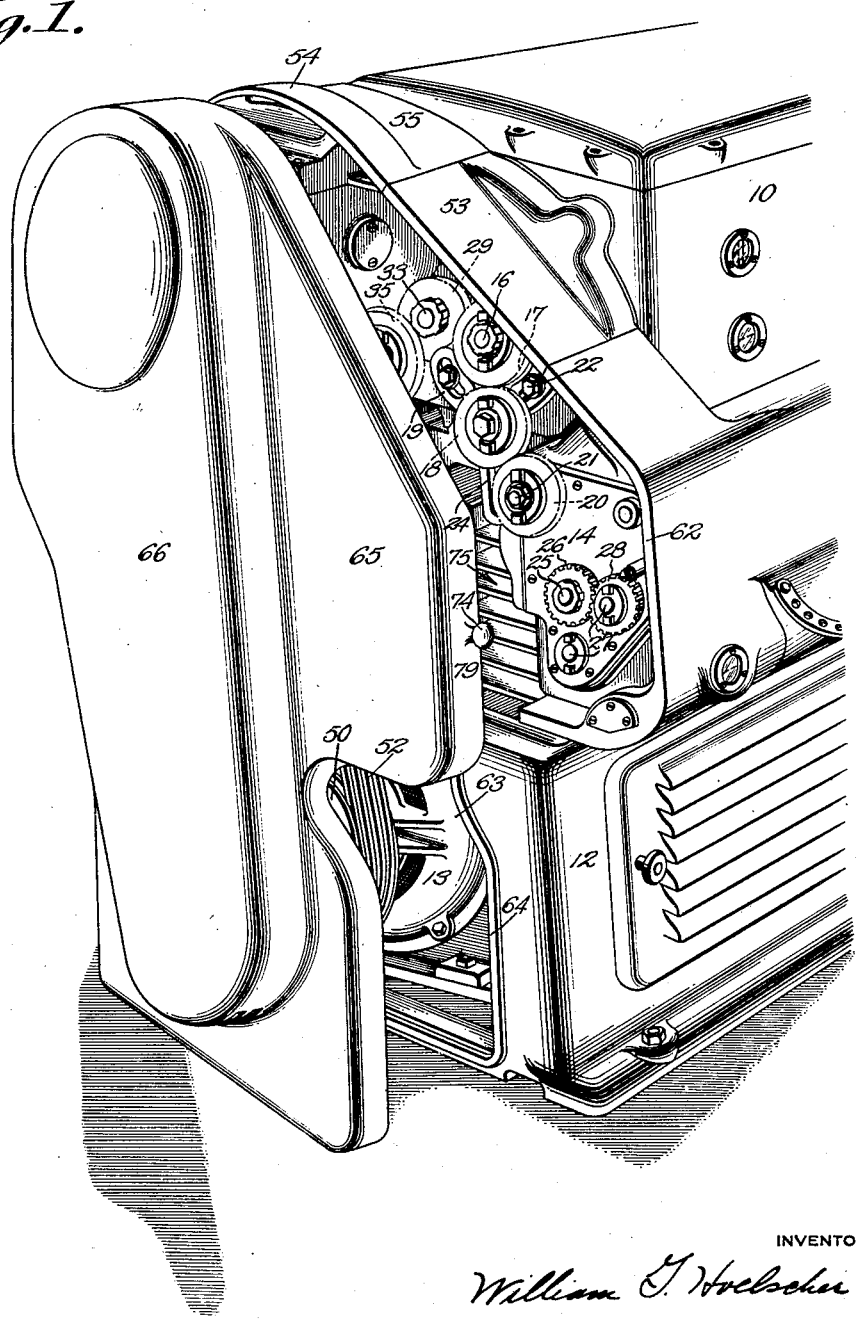
Figure 1 is a perspective view of the headstock end of the lathe showing the end cover partially open.

The features of this invention are entirely associated with the headstock end of the lathe and for this reason the detail description is confined to the structure at this end. However, in general the major parts of the lathe are conventionally described as the headstock 10, resting on one end of a lathe bed 11, and the bed supported on a base 12.

An electric motor 13 is mounted within the casing structure of the base and furnishes the power for the lathe through a pulley and belt connection to the headstock. The feed box 14 for the lead screw and feed shaft is attached to the forward side of the bed and is driven by means of a gear train from a headstock shaft extended from the headstock casing. Gearing also extends from the extended shaft to the back shaft 15.

The various major parts of the lathe such as the headstock, bed, feed box, and base, incorporate interfitting casing structures, which when assembled form the frame for a door or closure at the headstock end of the lathe for fully closing in all the extended driving parts.

As stated, the present invention is not concerned with the mechanism contained within the various major assemblies such as the headstock and the feed box but is concerned with the extended gearing and the closure therefor. For details of construction within the headstock and the extended transmission as well as the feed box, reference may be made to applicant's co-pending cases: Lathe headstock, filed April 27, 1932, Serial No. 607,827. Feed box transmission, filed August 17, 1932, Serial No. 629,163.

The drive is taken from the headstock through a shaft 16 located just below the spindle and extended exteriorly of the headstock. A gear 17 is fixed on the extended end of the shaft 16 and this gear 17 is in mesh with a shiftable gear 18 journalled in a swinging quadrant 19 for swinging the latter gear 18 into engagement with the gear 20 on a shaft 21 of the feed box at the outside thereof. The quadrant is rotatively mounted on the axis of the shaft 16 which carries the initial exterior driving gear 16 and is fixed in position by means of screws 22 of the headstock disposed through slots 23 in the quadrant which are concentric with the axis of the shaft.

The gear 18 of the quadrant is journalled in a radial slot 24 and may therefore have its axis shifted radially relative to the quadrant axis in the event of change in the size of the gear for speed variation. The gears 17, 18 and 20 are each replaceable or are interchangeable with other gears of different diameters when the feed is to be varied or the thread pitch or lead is to be varied as for diametral pitch leads, module leads, etc. The change gears for this purpose are contained in a rack hereinafter described.

From the shaft 21 which extends from the feed box and through which the drive is delivered to the feed box, the gearing extends within the feed box (not shown) for the purpose of driving another shaft 25 which protrudes from the end of the feed box. The details of the feed box gearing are not shown since a description of the exterior arrangement of gears suffices for an understanding of this invention.

A gear 26 is mounted on the shaft 25 and is positioned relative to a pair of shafts 27, 27, for driving either one through a gear 28 which is transposable from one of the shafts 27 to the other. That is to say, the centers or axes of the shafts 27 are equidistant from the axis of the extended driving gear 26 and consequently the single transposable gear 28 of appropriate diameter will mesh with the driving gear in either position. Accordingly, the drive may be directed either to the one shaft 27 or to the other shaft 27, the conversion or transposition of the drive being for the purpose of converting the ratio of the gearing and imparting two sets of speeds of entirely different value to the feed screw and the feed shaft which extends from the feed box along the forward side of the bed.

The drive is also delivered from the gear 17 of the headstock to the rear side of the lathe for the purpose of driving the back shaft disposed along the rear of the bed. For this purpose the drive extends through a gear 29 to a compound gear 30 and meshing with the smaller gear 32 thereof. These gears 29 and 30 are mounted on short shafts 33 and 34 respectively which extend from the end of the headstock.

The larger gear 35 of this compound gear meshes with a smaller gear 36 of a compound gear 37 mounted on a short shaft 38. The larger gear 39 of the compound gear 37 is in mesh with a small gear 40 of a compound gear 41. The compound gear 41 is adjustably mounted in the slot 42 of a quadrant 43. The quadrant 43 is rotatively mounted on the axis of the compound gear 37 and is secured in position against rotation by means of screws 44 screwed into a side bearing bracket 45, these screws passing through slots 46 of the quadrant concentric with the axis of quadrant rotation.

Rotation of the quadrant moves the swinging compound gear 41 toward and from the axis of the back shaft 15 for meshing the large gear 48 of the compound gear 41 with a change gear 49 fixed on the back shaft. The gears 39, 40, 48 and 49 are in each case conveniently replaced by other gears of different sizes, which gears are contained and displayed nearby in the gear rack supporting the change gears for the feed box drive as hereinafter described.

The transmissions which have been described are all exposed beyond the general lathe structure, that is to say, are mounted exteriorly and against the substantially flush ends of end plates or faces of the headstock casing, feed box and the bracket 45 for the back shaft. The power of the lathe as stated is derived from the electric motor enclosed in the base thereof. This motor includes a pulley 50 which drives the power pulley 51 of the headstock through a belt 52, the pulley and belt assembly being disposed beyond the transmission previously described.

Each of the various units at this end of the lathe includes end closure wall or frame sections which when assembled form an overhanging casing wall and a frame for the end closure door. The headstock incorporates an inclined flange 53 representing a section of the inclined top wall overhanging the gearing. An extension 54 of this wall is provided by means of a casing element 55 fixed to the headstock. A plate 56 is secured, by screws 57 passing through flanges 58, to the side of the headstock and to the side of the bed and provides the side wall section 59 for the closure frame. This plate 56 incorporates lugs 60 which carry hinge pins 61 for the closure door. The plate 56 is formed to fit about the bearing bracket 45.

The other side wall section is formed by means of a flange 62 of the feed box which also provides a section of the inclined top wall.

The base of the lathe is of casing form providing an opening 63 in the end having a marginal flange 64 forming a frame for the closure, the motor being contained within the base closure and having its pulley extended through the opening.

As shown in the perspective view, the co-related flanges and closure walls forming the door frame at the end of the lathe coincide with the irregular outline of the casing-like closure 65 which is hinged on the pintle elements 61 which are screwed into the hinge flanges extended integral with the side plate of the closure. The door is appropriately recessed as at 66 for housing the belt and pulley assembly.

A latch 67 is provided, (see Figure 5) for fastening the door in closed position. The stationary element of the latch is screwed into the end plate of the feed box and is in the form of a stud 68 carrying a screw 69 in its outer end held in position by means of a nut 70 and having a pointed end 71 with an annular recess 72 incorporated in the taper of the point. The latch comprises a detent which is mounted in the lateral flange of the door and includes a tapered point 73 cooperating with the annular groove and having a knob 74 on its outer end for manipulation.

The gear rack 75 is mounted in a recess 76 in the end of the bed within the closure and is attached to the bed by means of screws 77 engaged through side flanges 78 of the rack. A series of pigeon holes 79 formed by cross shelving in the hollow box-like structure of the rack are adapted to contain different size gears shown at 80 which are adapted to be conveniently interchanged with the change gears 18 and 49 for appropriate speed changes. The rack face (see Figure 4) is inclined, the smaller gears going on the top shelves and the larger on the lower shelves. Moreover the side wall is also inclined to provide shelves of greater width at the lower end. A vertical flange 81 along the forward edge of the side wall carries the notations of the gear sizes arranged in a vertical row.

Having described my invention, I claim:

1. A lathe structure, comprising, a bed, a support for said bed, a headstock mounted on one end of said bed, a feed box attached to one side of the bed, a bearing bracket for a lathe back shaft fixed to the other side of said bed, all of said elements, except the bed, including flanges which when assembled form a door frame extending entirely around the headstock end of the lathe, and a closure door hinged to said frame whereby the transmission parts between the various elements of the lathe are conveniently accessible and coverable.

2. A lathe structure, comprising, a bed, a support for said bed, a headstock mounted on one end of said bed, a feed box attached to one side of the bed, a back shaft bearing bracket fixed to the other side of said bed, all of said elements except the bed including sections of closure frame flanges which when assembled form a complete closure frame extending entirely around the headstock end of the lathe, a gear rack mounted within the frame, and a closure door hinged to said closure frame for covering the end of the lathe.

3. A lathe, comprising, a bed, a support for said bed, a headstock supported on said bed, a feed box mounted on the side of said bed, a back shaft, a back shaft bearing support bracket mounted on the other side of said bed, flanges extended from said support headstock, feedbox, and bracket around the outer sides thereof and combining to form a substantially continuous closure frame, a door for the space embraced by said frame, change gearing extended from said headstock to said feed box and said back shaft, a gear rack mounted on the lathe end within the space, whereby the change gears of the gearing may be stored near the transmission.

4. A lathe, comprising, a bed, a support for said bed, a headstock supported on said bed, a feed box mounted on the forward side of said bed, a back shaft bearing support bracket mounted on the rear side of said bed, flanges formed on the outer side of all of said elements except the bed, said flanges combining to form an open end compartment for the end of the lathe, a recess in the end of the bed, a gear box mounted in said recess, a transmission extending from the end of the headstock to the feed box and to the back shaft, and a cover for said open end compartment.

5. A lathe, comprising, a bed, a support for said bed, a headstock mounted on one end of said bed, said support and headstock including compartments having open end faces, the walls of said compartments joining to form a door frame, and a closure door for said compartments hinged to said door frame, whereby the entire end of the lathe is covered and various driving gears from the headstock may be encased therein.

WILLIAM G. HOELSCHER.